US006983222B1

(12) United States Patent  (10) Patent No.:  US 6,983,222 B1
O'Brien, Jr.  (45) Date of Patent:  Jan. 3, 2006

(54) MULTI-STAGE PLANAR STOCHASTIC MENSURATION

(75) Inventor: Francis J. O'Brien, Jr., Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 19 days.

(21) Appl. No.: 10/863,838

(22) Filed: Jun. 1, 2004

(51) Int. Cl.
 *G06F 101/14* (2006.01)
 *G06F 17/18* (2006.01)

(52) U.S. Cl. ............................................ 702/181
(58) Field of Classification Search ............... 702/94, 702/95, 150, 179, 181; 708/200, 201, 520
 See application file for complete search history.

(56) References Cited

U.S. PATENT DOCUMENTS

| 5,144,595 | A | 9/1992 | Graham et al. |
| 5,675,553 | A | 10/1997 | O'Brien, Jr. et al. |
| 5,703,906 | A | 12/1997 | O'Brien, Jr. et al. |
| 5,757,675 | A | 5/1998 | O'Brien, Jr. |
| 5,781,460 | A | 7/1998 | Nguyen et al. |
| 5,963,591 | A | 10/1999 | O'Brien, Jr. et al. |
| 5,996,414 | A | 12/1999 | Mercado |
| 6,397,234 | B1 | 5/2002 | O'Brien, Jr. et al. |
| 6,466,516 | B1 * | 10/2002 | O'Brien et al. ............. 367/131 |

OTHER PUBLICATIONS

Hoel et al., Introduction to Theory of Probability, Houghton-Mifflin, Boston, MA 1971, pp 1-5.*
G.H. Moore & W.A. Wallis, 1943 "Time Series Significance Tests Based on Signs of Difference", Journal of the American Statistical Assoc., vol. 39 pp. 153-164.

* cited by examiner

*Primary Examiner*—Michael Nghiem
(74) *Attorney, Agent, or Firm*—James M. Kasischke; Michael P. Stanley; Jean-Paul A. Nasser (57) ABSTRACT

The method includes reading a data set including a sparse number of data points and applying multiple tests wherein the results are evaluated by a decision module to determine whether to classify the data as random or nonrandom. In one preferred embodiment, if any one test determines the data is nonrandom, then the data is labeled nonrandom. The data is labeled and stored prior to beginning the method once again for the next set of data.

11 Claims, 3 Drawing Sheets

MULTI-STAGE PLANAR STOCHASTIC MENSURATION

STATEMENT OF GOVERNMENT INTEREST

The invention described herein may be manufactured and used by or for the Government of the United States of America for Governmental purposes without the payment of any royalties thereon or therefore.

CROSS REFERENCE TO RELATED PATENT APPLICATIONS

The present application is related to the following copending applications: application of F. J. O'Brien, Jr. entitled "Detection of Randomness in Sparse Data Set of Three Dimensional Time Series Distributions," Ser. No. 10/679,686, filed 6 Oct. 2003; application of F. J. O'Brien, Jr. entitled "Enhanced System for Detection of Randomness in Sparse Time Series Distributions," Ser. No. 10/794,545 filed 3 Mar. 2004; application of F. J. O'Brien, Jr. and Chung T. Nguyen entitled "Method for Classifying a Random Process for Data Sets in Arbitrary Dimensions," Ser. No. 10/863,836 filed on even date with the present application; application of F. J. O'Brien, Jr. entitled "Method for Detecting a Spatial Random Process Using Planar Convex Polygon Envelope," Ser. No. 10/863,840 filed on even date with the present application; and application of F. J. O'Brien, Jr. entitled "Method for Sparse Data Two-Stage Stochastic Mensuration," Ser. No. 10/863,839 filed on even date with the present application.

BACKGROUND OF THE INVENTION (1) Field of the Invention

The present invention relates generally to the field of sonar signal processing and, more particularly, preferably comprises a multistage automated method to measure the spatial arrangement among a very small number of measurements whereby an ascertainment of the mathematical property of randomness (or noise-degree) may be made.

(2) Description of the Prior Art

Naval sonar systems require that signals be classified according to structure; i.e., periodic, transient, random or chaotic. For instance, in many cases it may be highly desirable and/or critical to know whether data received by a sonar system is simply random noise, which may be a false alarm, or is more likely due to detection of a submarine or other vessel of interest. In the study of nonlinear dynamics analysis, scientists, in a search for "chaos" in signals or other physical measurements, often resort to embedding dimensions analysis," or "phase-space portrait analysis." One method of finding chaos is by selecting the appropriate time-delay close to the first "zero-crossing" of the autocorrelation function, and then performing delay plot analyses. Other methods for detection of spatial randomness are based on an approach sometimes known as "box counting" and/or "box counting enumerative" models. Other methods such as power spectral density (PSD) techniques may be employed in naval sonar systems. Methods such as these may be discussed in the subsequently listed patents and/or the above-cited related patent applications which are hereby incorporated by reference and may also be discussed in patents and/or applications by the inventors of the above-cited related patent applications and/or subsequently listed patents.

It is also noted that recent research has revealed a critical need for highly sparse data set time distribution analysis methods and apparatus separate and apart from those adapted for treating large sample distributions. It is well known that large sample methods often fail when applied to small sample distributions, but that the same is not necessarily true for small sample methods applied to large data sets. Very small data set distributions may be defined as those with less than about ten (10) to thirty (30) measurement (data) points.

General probability theory related hereto is found in P. J. Hoel et al., *Introduction to the Theory of Probability*, Boston, Houghton-Mifflin, 1971 which is incorporated herein by reference. An example of the Runs Test is described in G. H. Moore & W. A. Wallis, 1943, "Time Series Significance Tests Based on Signs of Difference", *Journal of the American Statistical Association*, vol. 39, pages 153–164 and is incorporated herein by reference. Small data distributions with less than ten to fifteen data measurements can be analyzed mathematically with certain nonparametric discrete probability distributions as opposed to large-sample methods, which employ continuous probability distributions (such as the Gaussian).

Nonparametric statistics is a field that treats discrete variables or a quantitative variable whose set of possible values is countable. Typical examples of discrete variables are variables whose possible values are a subset of the integers, such as discrete time increments, $t_0=0$, $t_1=1$, $t_2=2$, ..., Social Security numbers, the number of people on a naval facility, ages rounded to the nearest year, or the number of pages in a DoD Technical Manual. Moreover, a random variable is discrete if and only if its cumulative probability distribution function is a stair-step function; i.e., if it is piecewise constant and only increases by discrete jumps.

Nonparametric probability and statistical methods were developed to be used in cases when the researcher does not know the parameters of the distribution of the variable of interest in the population (hence the name nonparametric). In other terms, nonparametric methods do not rely on the estimation of parameters (such as the mean or the standard deviation) describing the distribution of the variable of interest in the population. Therefore, these methods are also sometimes (and more appropriately) called parameter-free methods or distribution-free. Examples of exemplary patents related to the general field of the endeavor of analysis of sonar signals include:

U.S. Pat. No. 5,675,553, issued Oct. 7, 1997, to O'Brien, Jr. et al., discloses a method for filling in missing data intelligence in a quantified time-dependent data signal that is generated by, e.g., an underwater acoustic sensing device. In accordance with one embodiment of the invention, this quantified time-dependent data signal is analyzed to determine the number and location of any intervals of missing data, i.e., gaps in the time series data signal caused by noise in the sensing equipment or the local environment. The quantified time-dependent data signal is also modified by a low pass filter to remove any undesirable high frequency noise components within the signal. A plurality of mathematical models are then individually tested to derive an optimum regression curve for that model, relative to a selected portion of the signal data immediately preceding each previously identified data gap. The aforesaid selected portion is empirically determined on the basis of a data base of signal values compiled from actual undersea propagated signals received in cases of known target motion scenarios. An optimum regression curve is that regression curve, linear or nonlinear, for which a mathematical convergence of the model is achieved. Convergence of the model is determined by application of a smallest root-mean-square analysis to each of the plurality of models tested. Once a model possessing the smallest root-mean-square value is derived from among the plurality of models tested, that optimum model is then selected, recorded, and stored for use in filling the data gap. This process is then repeated for each subsequent data gap until all of the identified data gaps are filled.

U.S. Pat. No. 5,703,906, issued Dec. 30, 1997, to O'Brien, Jr. et al., discloses a signal processing system which processes a digital signal, generally in response to an analog signal which includes a noise component and possibly also an information component representing three mutually orthogonal items of measurement information represented as a sample point in a symbolic Cartesian three-dimensional spatial reference system. A noise likelihood determination sub-system receives the digital signal and generates a random noise assessment of whether or not the digital signal comprises solely random noise, and if not, generates an assessment of degree-of-randomness. The noise likelihood determination system controls the operation of an information processing sub-system for extracting the information component in response to the random noise assessment or a combination of the random noise assessment and the degree-of-randomness assessment. The information processing system is illustrated as combat control equipment for submarine warfare, which utilizes a sonar signal produced by a towed linear transducer array, and whose mode operation employs three orthogonally related dimensions of data, namely: (i) clock time associated with the interval of time over which the sample point measurements are taken, (ii) conical angle representing bearing of a passive sonar contact derived from the signal produced by the towed array, and (iii) a frequency characteristic of the sonar signal.

U.S. Pat. No. 5,966,414, issued Oct. 12, 1999, to Francis J. O'Brien, Jr., discloses a signal processing system which processes a digital signal generated in response to an analog signal which includes a noise component and possibly also an information component. An information processing sub-system receives said digital signal and processes it to extract the information component. A noise likelihood determination sub-system receives the digital signal and generates a random noise assessment that the digital signal comprises solely random noise, and controls the operation of the information processing sub-system in response to the random noise assessment.

U.S. Pat. No. 5,781,460, issued Jul. 14, 1998, to Nguyen et al., discloses a chaotic signal processing system which receives an input signal from a sensor in a chaotic environment and performs a processing operation in connection therewith to provide an output useful in identifying one of a plurality of chaotic processes in the chaotic environment. The chaotic signal processing system comprises an input section, a processing section and a control section. The input section is responsive to input data selection information for providing a digital data stream selectively representative of the input signal provided by the sensor or a synthetic input representative of a selected chaotic process. The processing section includes a plurality of processing modules each for receiving the digital data stream from the input means and for generating therefrom an output useful in identifying one of a plurality of chaotic processes. The processing section is responsive to processing selection information to select one of the plurality of processing modules to provide the output. The control module generates the input data selection information and the processing selection information in response to inputs provided by an operator.

U.S. Pat. No. 5,963,591, issued Oct. 5, 1999, to O'Brien, Jr. et al., discloses a signal processing system which processes a digital signal generally in response to an analog signal which includes a noise component and possibly also an information component representing four mutually orthogonal items of measurement information representable as a sample point in a symbolic four-dimensional hyperspatial reference system. An information processing and decision sub-system receives said digital signal and processes it to extract the information component. A noise likelihood determination sub-system receives the digital signal and generates a random noise assessment of whether or not the digital signal comprises solely random noise, and if not, generates an assessment of degree-of-randomness. The noise likelihood determination system controls whether or not the information processing and decision sub-system is used, in response to one or both of these generated outputs. One prospective practical application of the invention is the performance of a triage function upon signals from sonar receivers aboard naval submarines, to determine suitability of the signal for feeding to a subsequent contact localization and motion analysis (CLMA) stage.

U.S. Pat. No. 6,397,234, issued May 28, 2002, to O'Brien, Jr. et al., discloses a method and apparatus are provided for automatically characterizing the spatial arrangement among the data points of a time series distribution in a data processing system wherein the classification of said time series distribution is required. The method and apparatus utilize a grid in Cartesian coordinates to determine (1) the number of cells in the grid containing at least-one input data point of the time series distribution; (2) the expected number of cells which would contain at least one data point in a random distribution in said grid; and (3) an upper and lower probability of false alarm above and below said expected value utilizing a discrete binomial probability relationship in order to analyze the randomness characteristic of the input time series distribution. A labeling device also is provided to label the time series distribution as either random or non-random.

U.S. Pat. No. 5,144,595, issued Sep. 1, 1992, to Graham et al., discloses an adaptive statistical filter providing improved performance target motion analysis noise discrimination includes a bank of parallel Kalman filters. Each filter estimates a statistic vector of specific order, which in the exemplary third order bank of filters of the preferred embodiment, respectively constitute coefficients of a constant, linear and quadratic fit. In addition, each filter provides a sum-of-squares residuals performance index. A sequential comparator is disclosed that performs a likelihood ratio test performed pairwise for a given model order and the next lowest, which indicates whether the tested model orders provide significant information above the next model order. The optimum model order is selected based on testing the highest model orders. A robust, unbiased estimate of minimal rank for information retention providing computational efficiency and improved performance noise discrimination is therewith accomplished.

U.S. Pat. No. 5,757,675, issued May 26, 1998, to O'Brien, Jr., discloses an improved method for laying out a workspace using the prior art crowding index, PDI, where the average interpoint distance between the personnel and/or equipment to be laid out can be determined. The improvement lies in using the convex hull area of the distribution of points being laid out within the workplace space to calculate the actual crowding index for the workspace. The convex hull area is that area having a boundary line connecting pairs of points being laid out such that no line connecting any pair of points crosses the boundary line. The calculation of the convex hull area is illustrated using Pick's theorem with additional methods using the Surveyor's Area formula and Hero's formula.

U.S. Pat. No. 6,466,516, issued Oct. 5, 1999, to O'Brien, Jr. et al., discloses a method and apparatus for automatically characterizing the spatial arrangement among the data points of a three-dimensional time series distribution in a data processing system wherein the classification of the time series distribution is required. The method and apparatus utilize grids in Cartesian coordinates to determine (1) the number of cubes in the grids containing at least one input data point of the time series distribution; (2) the expected number of cubes which would contain at least one data point in a random distribution in said grids; and (3) an upper and lower probability of false alarm above and below said expected value utilizing a discrete binomial probability relationship in order to analyze the randomness characteristic of the input time series distribution. A labeling device also is provided to label the time series distribution as either random or nonrandom, and/or random or nonrandom within what probability, prior to its output from the invention to the remainder of the data processing system for further analysis.

The above cited art, while extremely useful, could be improved with the capability of measuring the spatial arrangement for data distributions with a very small number of points, objects, measurements and then labeling nonrandom distributions correctly more often, and in special cases, as disclosed utilizing the method taught herein. Consequently, those of skill in the art will appreciate the present invention which addresses these and other problems.

SUMMARY OF THE INVENTION

Accordingly, it is an object of the invention to provide a method for classifying data sets as either random or nonrandom.

It is another object of the present invention to provide a method capable of more accurately classify a very small number of points, objects, measurements or the like.

Yet another object of the present invention is to provide a useful method for classifying data produced by naval sonar, radar, and/or lidar in aircraft and missile tracking systems as indications of how and from which direction the data was originally generated.

These and other objects, features, and advantages of the present invention will become apparent from the drawings, the descriptions given herein, and the appended claims. However, it will be understood that above listed objects and advantages of the invention are intended only as an aid in understanding certain aspects of the invention, are not intended to limit the invention in any way, and do not form a comprehensive or exclusive list of objects, features, and advantages.

Accordingly, the present invention provides a method for characterizing a plurality of sparse data sets with less than twenty to thirty data points in a two-dimensional Cartesian space as random or nonrandom. The data sets may be based on data produced by sonar, radar, lidar, and the like. The method comprises one or more steps such as, for instance, reading in data points for a first data set from the plurality of data sets, counting the data points to determine a total number N of the data points, determining an amplitude range of the data points, and/or selecting a false alarm rate whereby random data will produce a false alarm. In a preferred embodiment several tests of the data are performed. The first test may comprise utilizing a nonparametric discrete probability distribution for initially classifying said first data set as random or nonrandom according to said first test.

Performing a second test may comprise partitioning x and y axes of the two-dimensional Cartesian space with integer partitioned spaces with unitary intervals based on a maximum range of x values of the data points and a maximum range of the y values of the data points, forming a second grid with a plurality of partitions based on the unitary intervals, designating each partition as zero if that partition contains no data points and as one if that partition contains a data point and/or forming a sequence of zero's and one's by sequentially looking at each row of the second grid and whether each partition is designated as zero or one. Other steps may comprise determining a number of runs r in the sequence wherein each run is a homogenous stream of zero's or one's followed by a different stream of zero's or one's wherein a total number of one's is $n_1$ and a total number of zero's is $n_2$, computing a Gaussian statistic Z and probability p from $n_1$ and $n_2$, and then classifying the first data set as nonrandom if p is less than or equal to the false alarm rate and random if p is greater than the false alarm rate as per the second test. Additional steps comprise utilizing the first test and the second test to finally classify the first data set as random or nonrandom.

An example of use of a nonparametric discrete probability distribution may comprise plotting the points in the two-dimensional Cartesian space, forming a first grid over the two-dimensional Cartesian space over the first set of data points wherein the grid area is based on the amplitude and the number N of data points, determining a number of cells in the first grid containing at least one input data point of the time series distribution, determining the expected number of cells which would contain at least one data point in a random distribution in the grid, and determining an upper and lower probability of false alarm above and below the expected value utilizing a discrete binomial probability relationship for classifying the first data set as random if within the upper and lower probability and nonrandom if outside the upper and lower probability as per the first test.

The method may further comprise performing a third test may comprise determining an R statistic. The method may further comprise a fourth test comprising a serial correlation classifying the first data set as random or nonrandom as per the fourth test. Additionally, the method may comprise utilizing the first test and the second test and the third test and the fourth test to finally classify the first data set as random or nonrandom. In one embodiment, if any of the first test and the second test and the third test and the fourth test indicate a nonrandom classification, then the method may comprise finally classifying the first data set as nonrandom, and otherwise classifying the first data set as random. The method may further comprise storing the classification for the first data set and reading in data points for a second data set from the plurality of data sets.

BRIEF DESCRIPTION OF THE DRAWINGS

Reference is made to the accompanying drawings in which is shown an illustrative embodiment of the apparatus and method of the invention, from which its novel features and advantages will be apparent to those skilled in the art, and wherein.

DESCRIPTION OF THE PREFERRED EMBODIMENT

The present invention describes a computer-aided multi-stage approach that may be taken for detecting stochastic (pure) randomness in two-dimensional space. A notable strength of the method is that it is distribution-free. This invention provides a novel means to determine whether the signal structure conforms to a random process (i.e. predominantly random). The specific utility of the methods presently disclosed is in the processing of data distributions containing a small number of points. The existence of such sparse data sets requires methods appropriate for processing them reliably and validly. Moreover, the method is applicable for larger data sets and may provide a higher degree of precision in the "random-not random" decision.

Figure 1A:
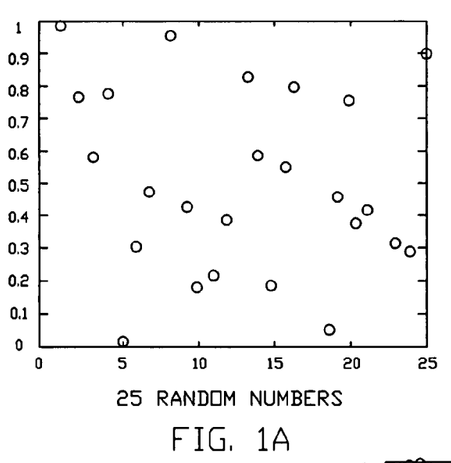
FIG. 1A is a diagram showing a hypothetical random distribution of a signal in time series with 25 random plots for use in a method in accord with the present invention.
Figure 1B:
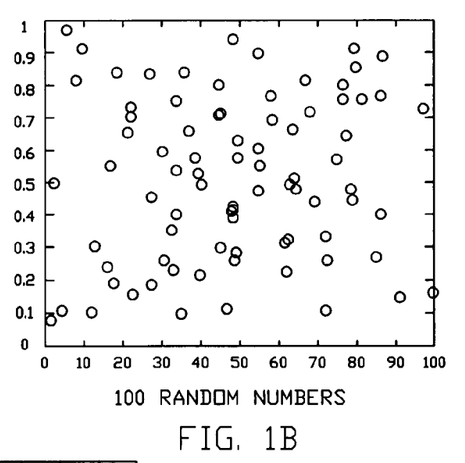
FIG. 1B is a diagram showing a hypothetical random distribution of a signal in time series with 100 random plots for use in a method in accord with the present invention.
Figure 1C:
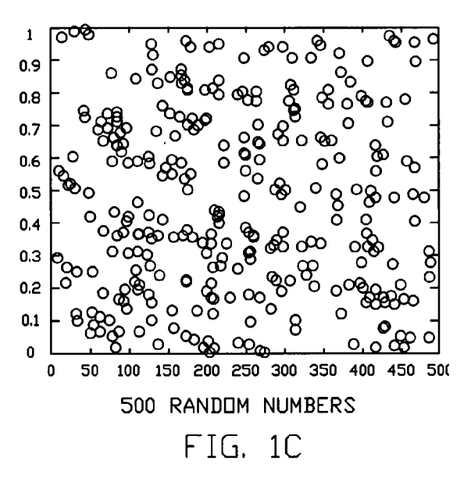
FIG. 1C is a diagram showing a hypothetical random distribution of a signal in time series with 500 random plots for use in a method in accord with the present invention.
Figure 2:
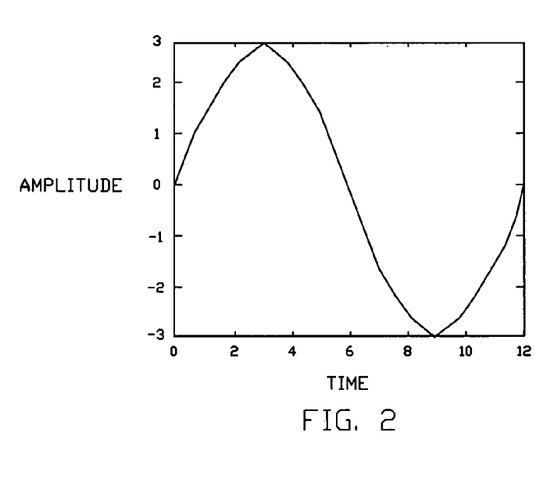
FIG. 2 is a diagram of a noise-free sine related function in accord with the present invention which prior art methods may classify incorrectly.
Figure 2A:
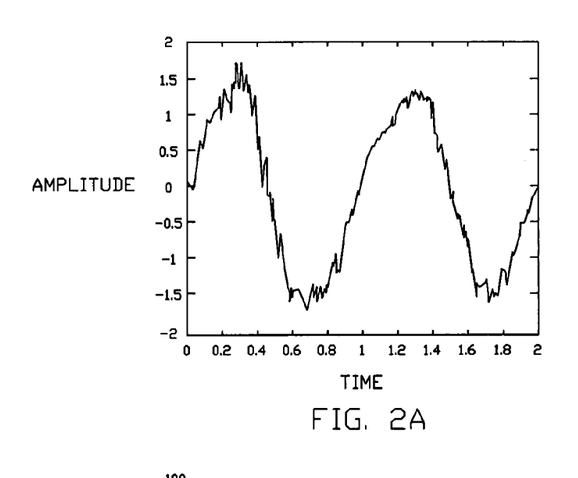
FIG. 2A is a diagram of the sine related function of FIG. 2 with some noise which prior art methods may classify incorrectly.
Figure 2B:
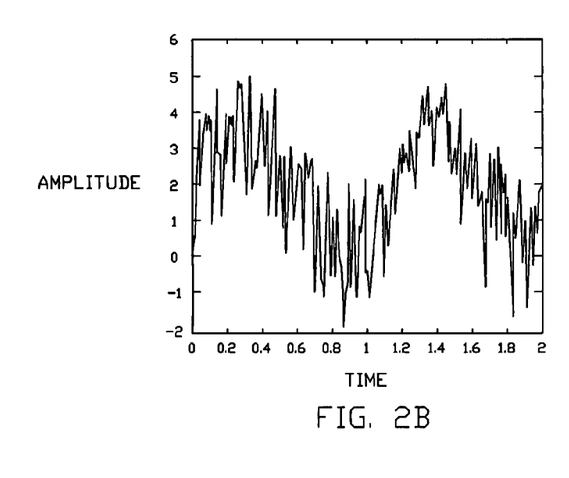
FIG. 2B is a diagram of the sine related function of FIG. 2 with significant noise which the prior art methods may classify incorrectly.
Figure 2C:
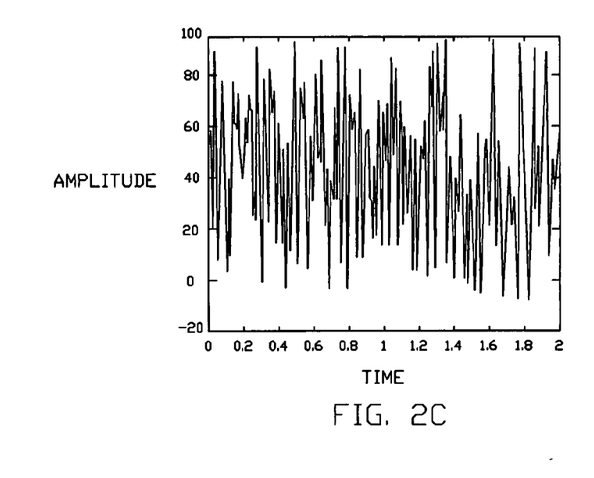
FIG. 2C is a diagram of the sine related function of FIG. 2 with heavy noise which the prior art methods may classify correctly.

Referring now to the drawings, FIG. 1A, FIG. 1B, and FIG. 1C, gives an indication of what this noise or random distribution property might look like for varying numbers of spatial objects if plotted in two dimensions for measurement amplitude in Cartesian space embedded in a finite time series. FIG. 2 is a specific example exemplifying the need for a new inventive method for detecting the widest range of data distributions encountered in navel sonar signal processing. FIG. 2 and variations thereof, namely FIG. 2A, FIG. 2B, and FIG. 2C provide additional information relevant to the present invention. FIG. 2 shows a noise-free sine related curve, namely:

$$f(x) = 3\sin\left(\frac{\pi}{6}x\right); 0 \leq x \leq 12. \tag{1}$$

Prior art methods have a tendency to classify such distributions incorrectly. Variations of FIG. 2 show a progressively more noisy sine related wave. Prior methods tend to make errors on all these types of distributions except for the distribution of FIG. 2C.

A further objective is to incorporate circumstances in which obviously nonrandom distributions (e.g., in FIG. 2, FIG. 2A, and FIG. 2B) are labeled correctly. It is apparently not well known or appreciated that a single measurement system designed to detect randomness occasionally fails for certain distributions. For example, the prior art methods U.S. Pat. No. 6,397,234, discussed above fail to detect non-randomness in data displayed in FIG. 2.

In studies where measurements are made according to some well-defined ordering, either in time or space, a frequent question is whether or not the average value of the measurement is different at different points in the sequence. The nonparametric one-sample Runs Test provides a means of testing this.

For a time series, a rectangular window is created around the spatial distribution. Then one creates subspaces on this region consisting of numerous small squares. Each square is assigned a value of 1 if a point or points are there; otherwise the cell is scored with a value of 0.

Count the number of "runs" in the ordered binary data. A run is a sequential homogeneous stream of 0 or 1 data followed by a different stream of homogeneous 0 or 1 data. Arbitrarily we label the total number of ones by $n_1$ and the total number of zeros as $n_2$. For example, the following data exhibit: $n_1=9$ ones and $n_2=13$ zeros; the total sample size is $N=n_1+n_2=22$, and 6 runs:

$$\underbrace{\underline{000}\ \underline{11}\ \underline{00000}\ \underline{1111}\ \underline{00000}\ \underline{111}}_{r=6}$$
$$\phantom{xx}1\phantom{xx}\phantom{xx}2\phantom{xx}\phantom{xx}3\phantom{xxxx}\phantom{xx}4\phantom{xxx}\phantom{xx}5\phantom{xxxxx}\phantom{xx}6$$

Here, the sample shows r=6 runs.

In a distribution that is truly a random one, we expect an average or mean number of runs E(r) to occur, namely:

$$E(r) = \frac{2n_1 n_2}{n_1 + n_2} + 1, \tag{2}$$

with a variance or spread in the number of runs equal to:

$$\sigma_r^2 = \frac{2n_1 n_2(2n_1 n_2 - n_1 - n_2)}{(n_1 + n_2)^2(n_1 + n_2 - 1)} \tag{3}$$

To assess statistically the relationship of the sample number of runs r in comparison to the distributional moments, E(r) and $\sigma_r^2$ we submit the sample and population parameters to a Gaussian test statistic, Z, in the following manner:

$$Z = \frac{r - E(r)}{\sqrt{\sigma_r^2}} \tag{4}$$

A standard normal or Gaussian distribution characterizes the measure Z (with mean $\mu=0$ and variance, $\sigma^2=1$). The significance probability p is then determined by evaluating the following definite integral by a standard Taylor series expansion:

$$p = P(|Z| \le z) = 1 - \int_{-|Z|}^{|Z|} (2\pi)^{-\frac{1}{2}} e^{-\frac{x^2}{2}} dx. \qquad (5)$$

Note that the Runs Tests calls for a 2-tailed probability—the total area p beyond $-|z|$ and $+|z|$.

The "probability of false alarm" (pfa) $\alpha$ is set to either 0.05, or 0.01 or 0.001. The pfa is the likelihood of labeling a distribution "nonrandom" that is truly random in structure, an error that must be kept low to assure speeding up the signal processing, and minimizing wasteful effort—a notable strength of the inventor's stochastic characterization patents.

Following are expanded explanations of each method step component, and then the detailed steps of the system and method.

For comparison purposes, a prior art partitioning scheme is well described in U.S. Pat. No. 6,397,234 referenced hereinbefore.

In accord with the present invention, a partitioning scheme for the second stage of the present inventive method functionally works in accordance with the following sequence of notations:

Notation:
Let a=lowest value for X-axis=min x
Let b=highest value for X-axis=max x
Let c=lowest value for Y-axis=min y
Let d=highest value for Y-axis=max y
Let $L_x$=b−a
Let $L_e$=d−c
Let Gint ($L_x$)=greatest integer value for x (i.e., round up quantity b−a to next integer; e.g. 17.6→18)
Let Gint($L_y$)=greatest integer value for y (i.e., round up quantity d−c to next integer)
Let $\Delta$=the diff. between $L_x$ and Gint($L_x$), and the difference between $L_y$ and Gint($L_y$)
$L'_x$=integer length of x (defined below)
$L'_y$=integer length of y (defined below)
Upper limit on y-axis is:

$$\max(y) + \frac{\Delta}{2}$$

Lower limit on y-axis is:

$$\min(y) - \frac{\Delta}{2}$$

Note that [Upper limit on y-axis is max $$(y) + \frac{\Delta}{2}$$

]—[Lower limit on y-axis is $$\min(y) - \frac{\Delta}{2}] = L'_y$$

(integer length of y); likewise for the x-axis (time).

In one embodiment of the method for selecting interval cuts, one unit may be added to the lower limit on the y-axis $$\min(y) - \frac{\Delta}{2}$$

for each interval cut until the value $$\max(y) + \frac{\Delta}{2}$$

is reached.

The same procedure can be used for determining interval cuts on the time axis (horizontal "abscissa").

Essentially the presently discussed partitioning scheme turns the length of the axes into integer partitioned spaces with unitary intervals. This partitioning scheme provides more (and smaller) subspace regions. In effect we are turning a small nonparametric sample test into a large sample test to increase its discriminatory power. This gives us the hedge required to reject the null hypothesis for truly nonrandom distributions. A pictorial representation of the partitioning scheme follows with cells labeled for reference as $C_{ij}$; showing k=6×4=24 partitions.

| Amplitude | $C_{41}$ | $C_{42}$ | $C_{43}$ | $C_{44}$ | $C_{45}$ | $C_{46}$ |
|---|---|---|---|---|---|---|
| | $C_{31}$ | $C_{32}$ | $C_{33}$ | $C_{34}$ | $C_{35}$ | $C_{36}$ |
| | $C_{21}$ | $C_{22}$ | $C_{23}$ | $C_{24}$ | $C_{25}$ | $C_{26}$ |
| | $C_{11}$ | $C_{12}$ | $C_{13}$ | $C_{14}$ | $C_{15}$ | $C_{16}$ |
| | $t_0$ | $t_1$ | $t_2$ | $t_3$ | $t_4$ | $t_5$ | $t_6$ |

Time

The subsystem assesses the random process binary hypothesis by testing:

$H_0: r=E(r)$(Noise)

$H_1: r \ne E(r)$(Signal+Noise) (5)

The data distribution is labeled "random" if the null hypothesis, $H_0$, is accepted—the probability of the Z value $p \ge \alpha$. The alternative hypothesis, $H_1$, is accepted if $p<\alpha$ indicating that the number of runs r is so small to warrant the conclusion "by the Runs Test, there appears to be sufficient signal in these data to warrant further processing".

U.S. Pat. No. 6,397,234 provides a measure which is often useful in the interpretation of outcomes, namely the R ratio, defined as the ratio of observed to expected occupancy rates:

$$R = \frac{m}{k * \Theta} \qquad (6)$$

where m=number of cells occupied, k=number of partitions, and $$\Theta = 1 - e^{-\frac{N}{k}}.$$

The range of values for R indicate:
 R<1, clustered
 R=1, random
 R>1, uniform

The minimum R=1/kΘ, and the maximum R=N/kΘ. The R statistic may be used in conjunction with other methods described hereinbefore or in the related applications in deciding to accept or reject the "white noise" hypothesis—or it may be used as the sole determinant.

A useful measure of the internal structure of a time series is the serial correlation, a procedure which is well known to those skilled in the art. The present invention exemplifies a serial correlation of lag-1 ($y_t$, $y_{t+1}$), but higher lags are also included by reference. A serial correlation close to or equal to a value of 0 indicates "randomness". The serial correlation coefficient follows from the standard calculation:

$$r_{y_t, y_{t+1}} = \frac{cov(y_t, y_{t+1})}{\sqrt{var(y_t) var(y_{t+1})}} \qquad (7)$$

Figure 3:
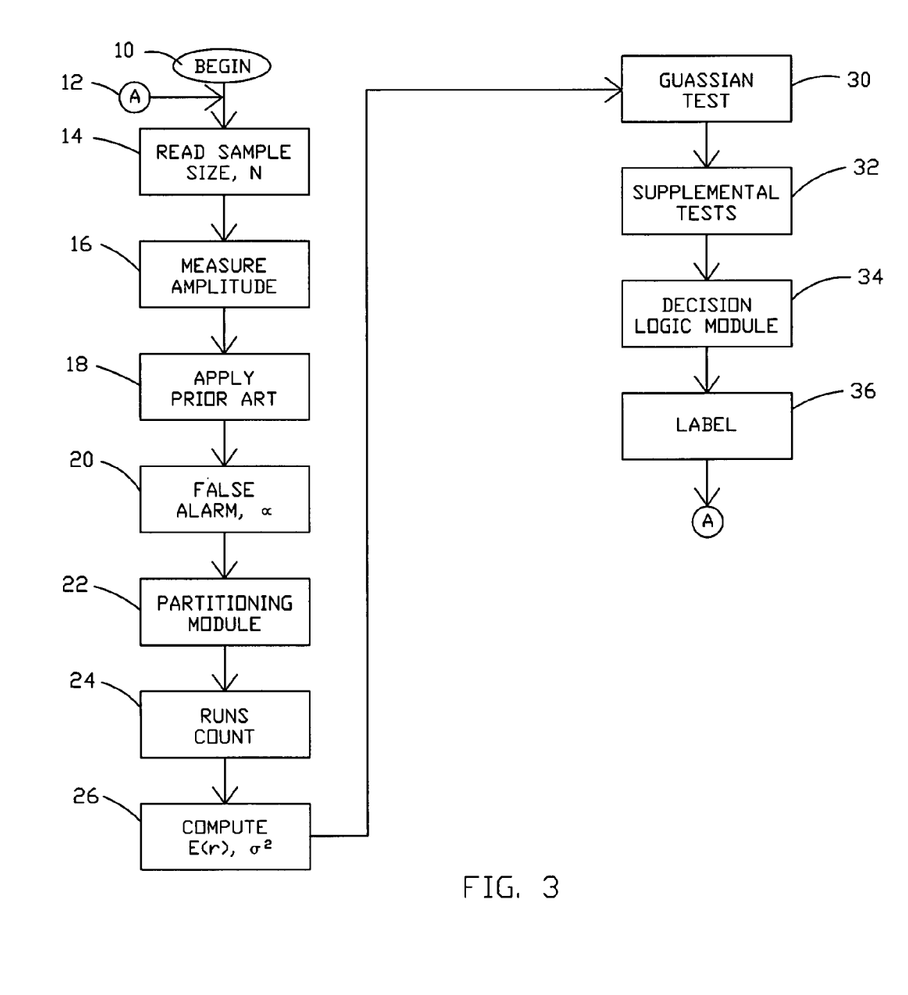
FIG. 3 is a flow diagram which describes steps of a method for classification in accord with the present invention.

FIG. 3 shows method steps for an embodiment of the invention. An explanation of the method steps of FIG. 3 is provided with an example to demonstrate the subsystem calculations.

TABLE 1

Illustrating Noise-free Sine Data

| X (time) | $f(x) = 3\sin(\frac{\pi}{6}x) = 3\sin(30x)$ |
|---|---|
| 0 | 0 |
| 1 | 1.50 |
| 2 | 2.60 |
| 3 | 3.00 |
| 4 | 2.60 |
| 5 | 1.50 |
| 6 | 0.0 |
| 7 | −1.50 |
| 8 | −2.60 |
| 9 | −3.00 |
| 10 | −2.60 |
| 11 | −1.50 |
| 12 | 0 |

Table 1. Illustrating Noise-Free Sine Data

Referring to Table 1 above which tabulates noise-free sine data as an example of operation of the method, we assume that in one window, at Δt=N=13 measurements with measured amplitude of |ΔY|=6 units.

In FIG. 3, the method begins as indicated at 10 whereby the program is loaded. In step 14, N is determined or selected. In the above table 13 points are plotted in the graph, thus N=13.

The amplitude is set, measured, and/or determined in step 16. As shown in the above table, the amplitude is:

|ΔY|=6 Units

Otherwise highly useful data processing techniques may then be applied as indicated at 18 to analyze the data, a specific example of which is shown in U.S. Pat. No. 6,397,234, discussed hereinbefore, wherein the calculations of that method would incorrectly indicate that the data in the above chart are "random". In step 20, the false alarm rate α, i.e., the rate at which random data will trigger a false alarm, is set such as by selection. In the present example, let α=0.05 although other values could also be selected.

TABLE 2

Y Values

| 2 to 3 | $C_{61}$ | 0 | 0 | 1 | 1 | 1 | 0 | 0 | 0 | 0 | 0 | 0 | 0 | 0 |
|---|---|---|---|---|---|---|---|---|---|---|---|---|---|---|
| | | | | | | | | | | | | | | $C_{6,13}$ |
| 1 to 2 | $C_{51}$ | 0 | 1 | 0 | 0 | 0 | 1 | 0 | 0 | 0 | 0 | 0 | 0 | 0 |
| 0 to 1 | $C_{41}$ | 1 | 0 | 0 | 0 | 0 | 0 | 1 | 0 | 0 | 0 | 0 | 0 | 1 |
| −1 to 0 | $C_{31}$ | 0 | 0 | 0 | 0 | 0 | 0 | 0 | 0 | 0 | 0 | 0 | 0 | 0 |
| −2 to −1 | $C_{21}$ | 0 | 0 | 0 | 0 | 0 | 0 | 1 | 0 | 0 | 0 | 1 | 0 |
| −3 to −2 | $C_{11}$ | 0 | 0 | 0 | 0 | 0 | 0 | 0 | 1 | 1 | 1 | 0 | 0 |
| | | | | | | | | | | | | | | $C_{1,13}$ |
| | | $t_0$ | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ |
| | | | | | | | | Time | | | | | | |

In step 22, partitioning of the coordinate system for the data is accomplished utilizing the method discussed hereinbefore for the following noise-free one-period sine wave:

$$f(x) = 3\sin\left(\frac{\pi}{6}x\right); \; 0 \leq x \leq 12 \text{ (one period)}.$$

The values of the sine curve shown in Table 1 above are plotted utilizing the partition scheme discussed hereinbefore as shown in Table 2 above. Based on the partitioning scheme discussed hereinbefore and as illustrated above for the present example, the distribution of γtxγy by gives 13×6=78 squares (k=78) with integer intervals (0≦t≦12;−3≦y≦+3). A cell is scored 0 if no plot point of f(x) is present, and a score of 1 if at least one plot point of f(x) is present. Table 2 illustrates the 0–1 structure by providing a matrix of binary values for $$f(x) = 3\sin\left(\frac{\pi}{6}x\right); \; 0 \leq x \leq 12$$

which is utilized to produce a confirmatory test of randomness with a one-sample Runs Test in accord with the present invention. It will be noted in viewing Table 2 that the one values connect to form a smooth sine function amplitude; $c_{ij}$ values identify each of the k=78 cells.

Based on Table 2, we perform the nonparametric Runs Test as per step 24. The 0–1 data are streamed by starting in row 1 at cell $c_{11}$ and extending to the end of row 1 at $C_{1,13}$. Returning to the starting point of the second row at $c_{21}$, and continuing in this fashion until the last cell $C_{6,13}$ is tallied. For the present example, k=78; $n_1$=13 cells occupied (scored 1); $n_2$= k−$n_1$=65 cells empty (scored 0). Then, as per step 24 the runs count is made by calculating the number of sample runs r, where in the present case r=17 runs.

In step 26, theoretical mean and variance parameters E(r) & $\sigma^2$ are calculated as indicated:

$$E(r) = \frac{2n_1 n_2}{n_1 + n_2} + 1 = 22.67$$

$$\sigma_r^2 = \frac{2n_1 n_2 (2n_1 n_2 - n_1 - n_2)}{(n_1 + n_2)^2 (n_1 + n_2 - 1)} = 5.82$$

In step 30, a Gaussian test is performed by computing Gaussian Statistic Z and probability P as indicated:

$$Z = \frac{r - E(r)}{\sqrt{\sigma_r^2}} = \frac{17 - 22.67}{\sqrt{5.82}} = -2.35$$

$$p = P(|Z| \le z) = 1 - \int_{-|Z|}^{|Z|} (2\pi)^{-\frac{1}{2}} e^{-\frac{x^2}{2}} dx = 0.0188$$

In step 32, one or more supplemental tests may be performed as desired. For instance, the R Statistic test shows R ≈ 1.09. This value represents the maximum value allowed for the data; m= 13; k=78, and $$\Theta = 1 - e^{-\frac{N}{k}} = 1 - e^{-\frac{13}{78}} = 0.1535,$$

so that $$\text{Max } R = \frac{m}{k\Theta} = \frac{13}{78(0.1535)} = 1.0856467.$$

Thus, the data are characterized by a uniform distribution of data (which corresponds to intuition). This result bolsters the utility of the R Statistic.

A Serial correlation may be calculated in the following fashion. The data in Table 1 is selected to form a lag of 1 as shown below:

TABLE 3

| $y_t$ | $y_{t-1}$ |
|---|---|
| 0 | 1.5 |
|   | 0 |
| 1.5 | 2.6 |
| 0 | 0 |
| 2.6 | 3.0 |
| 0. | 0 |
| 3.0 | 2.6 |
| 0 | 0 |
| 2.6 | 1.5 |
| 0 | 0 |
| 1.5 | 0 |
| 0 |   |
| 0 | — |
|   | 1.5 |
|   | 0 |
| — | — |
| 1.5 | 2.6 |
| 0 | 0 |

TABLE 3-continued

| $y_t$ | $y_{t-1}$ |
|---|---|
| 2.6 | 3.0 |
| 0 | 0 |
| 3.0 | 2.6 |
| 0 | 0 |
| — | — |
| 2.6 | 1.5 |
| 0 | 0 |
|   | 0 |
| 1.5 |   |
| 0 |   |

Computations show that the Serial Correlation, $r_{y_t, y_{t+1}} = 0.87$, indicating a substantial nonrandom trend in the trigonometric time series. The possible range of the correlation is: $-1 \le r_{y_t, y_{t+1}} \le 1$, with $r_{y_t, y_{t+1}} \approx 0$ indicating stochastic randomness for this lag-1 system.

In step 34, decision module 34 is utilized to determine if whether the tests of step 18, 30, or 32 are determined to be "nonrandom." If so, then the data is considered "nonrandom." Otherwise the data is labeled, "Random."

Since $p=0.0188<\alpha=0.05$, we reject $H_0$ (noise only) and conclude the sine wave data does not represent a stochastically random data set. Thus we reject the null hypothesis of "noise only" and conclude this data distribution has "signal" in its structure (is not random in behavior).

The R-statistic and serial correlation calculations lend further support to the judgment that the data are not spatially stochastic. Thus, decision ="Nonrandom" is very appropriate. As discussed above, the previous method of U.S. Pat. No. 6,397,234 would deem this trigonometric distribution "random" despite visual evidence to the contrary. As a general rule, caution and some human-oversight is advised because of the difficulty that any statistical procedure being able to detect every instance of a random or nonrandom distribution in a completely automated fashion. But, since at least one test in accord with the present method provides evidence that the data is not random, the overall conclusion is that the data is nonrandom. We are now in a position to say that the multi-gate method of the present invention detects obviously nonrandom data with a fair amount of precision.

Accordingly as per step 36, the data is labeled "random" or "nonrandom" in accordance with results from decision logic module 34. Thus in the present example, Label="Nonrandom".

The method then goes to "A" which loops the method back to the beginning as indicated at 12, to thereby test another set of data.

The method of the present invention is suitable for sparse data and enhances robustness of method by labeling nonrandom distributions correctly more often than prior art methods. Both the R-statistic and serial correlation are alternative (and recommended) procedures.

In summary, the method comprises reading the sample size N as indicated at 14, applying a multiple tests to the data a indicated generally at steps 18, 30, and 32. Decision module 34 then evaluates the results of the multiple tests. In one preferred embodiment, if any one test determines the data is nonrandom, then the data is labeled nonrandom as indicated at 36. The data and label are stored prior to beginning the method once again for the next set of data.

It will be understood that many additional changes in the details, steps, types of spaces, and size of samples, and arrangement of steps or types of test, which have been herein described and illustrated in order to explain the nature of the invention, may be made by those skilled in the art within the principles and scope of the invention as expressed in the appended claims.

What is claimed is:

1. A method for characterizing a plurality of sparse data sets with less than twenty to thirty data points in a two-dimensional Cartesian space as random or nonrandom, said data sets being based on a plurality of measurements of one or more physical phenomena, said method comprising the steps of:

reading in data points for a first data set from said plurality of data sets;

counting said data points to determine a total number N of said data points;

determining an amplitude range of said data points;

selecting a false alarm rate whereby a rate is provided for which random data will produce a false alarm;

performing a first test comprising utilizing a nonparametric discrete probability distribution for initially classifying said first data set as random or nonrandom as per said first test; and performing a second test comprising:

partitioning x and y axes of said two-dimensional Cartesian space comprising integer partitioned spaces with unitary intervals based on a maximum range of x values of said data points and a maximum range of said y values of said data points, forming a second grid with a plurality of partitions based on said unitary intervals, designating each partition as zero if that partition contains no data points and as one if that partition contains a data point, forming a sequence of zeros and ones by sequentially looking at each row of said second grid and whether each partition is designated as zero or one, determining a number of runs r in said sequence wherein each run is a homogenous stream of zeros or ones followed by a different stream of zeros or one's wherein a total number of ones is $n_1$ and a total number of zeros is $n_2$, computing a Gaussian statistic Z and probability p from $n_1$ and $n_2$, and initially classifying said first data set as nonrandom if p is greater than said false alarm rate and random if p is greater than said false alarm rate as per said second test; and utilizing said steps of initially classifying said first data set as per said first test and as per said second test to finally classify said first data set as random or nonrandom.

2. The method of claim 1 wherein said first test further comprises:

plotting said points in said two-dimensional Cartesian space;

forming a first grid over said two-dimensional Cartesian space over said first set of data points wherein said grid area is based on said amplitude and said number N of data points;

determining a number of cells in said first grid containing at least one input data point of the time series distribution;

determining the expected number of cells which would contain at least one data point in a random distribution in said grid; and determining an upper and lower probability of false alarm above and below said expected value utilizing a discrete binomial probability relationship for initially classifying said first data set as random if within said upper and lower probability and nonrandom if outside said upper and lower probability.

3. The method of claim 1 further comprising performing a third test comprising determining an R statistic as described by the following equation:

$$R = \frac{m}{k*\Theta},$$

where m=number of cells occupied, k=number of partitions, $$\Theta = 1 - e^{-\frac{N}{k}},$$

such that said data is test three classified as follows:

R<1, clustered

R=1, random

R>1, uniform; and utilizing said first test and said second test and said third test to finally classify said first data set as random or nonrandom.

4. The method of claim 3 further comprising a fourth test comprising a serial correlation for initially classifying said first data set as random or nonrandom, and utilizing said first test and said second test and said third test and said fourth test to finally classify said first data set as random or nonrandom.

5. The method of claim 4 wherein said serial correlation is described by the following equation:

$$r_{y_t,y_{t+1}} = \frac{\text{cov}(y_t, y_{t+1})}{\sqrt{\text{var}(y_t)\text{var}(y_{t+1})}}.$$

6. The method of claim 4 wherein if any of said first test and said second test and said third test and said fourth test initially classify said first data set as nonrandom, then finally classifying said first data set as nonrandom, and otherwise classifying said first data set as random.

7. The method of claim 6, further comprising storing said classification for said first data set and reading in data points for a second data set from said plurality of data sets.

8. The method of claim 1, where in said steps of said second test further comprise:

let a=lowest value for said x axis=min(x), let b= highest value for said x axis=max(x), let c=lowest value for said y axis=min(y), let d=highest value for said y axis=max(y), let $L_x$=b−a, let $L_e$=d−c, let Gint ($L_x$) =greatest integer value for x=b−a rounded up to a next integer, let Gint($L_y$)=greatest integer value for y=d−c rounded up to next integer, let $\Delta_x$=Gint($L_x$)−$L_x$, let $\Delta_y$=Gint($L_y$)−$L_y$, then an upper limit of said second grid on said y axis is $$\max(y) + \frac{\Delta}{2},$$

and a lower limit on said y axis is $$\min(y) - \frac{\Delta}{2}.$$

9. The method of claim 8 wherein said $$\max(y) + \frac{\Delta}{2} - \min(y) - \frac{\Delta}{2} = L'_y$$

which is an integer length of y for said second grid.

10. The method of claim 9 wherein said $$\max(x) + \frac{\Delta}{2} L'_x - \min(x) - \frac{\Delta}{2} = L'_x$$

which is an integer length of x.

11. The method of claim 1 wherein said second test further comprises:

determining a mean as described by the following equation:

$$E(r) = \frac{2n_1 n_2}{n_1 + n_2} + 1;$$

determining a variance as described by the following equation:

$$\sigma_r^2 = \frac{2n_1 n_2 (2n_1 n_2 - n_1 - n_2)}{(n_1 + n_2)^2 (n_1 + n_2 - 1)};$$

and wherein said Gaussian statistic Z and said probability p are further described by the following equations:

$$Z = \frac{r - E(r)}{\sqrt{\sigma_r^2}},$$

and $$p = P(|Z| \leq z) = 1 - \int_{-|Z|}^{|Z|} (2\pi)^{-\frac{1}{2}} e^{-\frac{x^2}{2}} dx.$$

* * * * *

UNITED STATES PATENT AND TRADEMARK OFFICE
CERTIFICATE OF CORRECTION

PATENT NO. : 6,983,222 B1 Page 1 of 1
APPLICATION NO. : 10/863838
DATED : January 3, 2006
INVENTOR(S) : Francis J. O'Brien, Jr.

It is certified that error appears in the above-identified patent and that said Letters Patent is hereby corrected as shown below:

In Col. 1, line 24, replace "on even date with the present application" with --9 June 2004--.

Signed and Sealed this

Eleventh Day of November, 2008

JON W. DUDAS
*Director of the United States Patent and Trademark Office*